US006577651B2

United States Patent
Singh et al.

(10) Patent No.: US 6,577,651 B2
(45) Date of Patent: Jun. 10, 2003

(54) METHODS AND APPARATUS FOR RETIMING AND REALIGNING SONET SIGNALS

(75) Inventors: Kumar Shakti Singh, New Delhi (IN); Pawan Goyal, New Delhi (IN); Arnab Basak, New Delhi (IN); Vikas Kumar, Noida (IN); Daniel C. Upp, Southbury, CT (US)

(73) Assignee: TranSwitch Corp., Shelton, CT (US)

( * ) Notice: Subject to any disclaimer, the term of this patent is extended or adjusted under 35 U.S.C. 154(b) by 0 days.

(21) Appl. No.: 09/768,430

(22) Filed: Jan. 24, 2001

(65) Prior Publication Data

US 2002/0154659 A1 Oct. 24, 2002

(51) Int. Cl.[7] .................................................. H04J 3/06
(52) U.S. Cl. ........................................ 370/509; 370/535
(58) Field of Search ................................. 370/509, 514, 370/535, 465, 476, 375, 506, 372, 522, 360, 359; 375/112

(56) References Cited

U.S. PATENT DOCUMENTS

| | | | | |
|---|---|---|---|---|
| 4,941,156 A | * | 7/1990 | Stern et al. ................... | 375/372 |
| 4,996,698 A | * | 2/1991 | Nelson ......................... | 375/372 |
| 5,257,261 A | * | 10/1993 | Parruck et al. ............... | 370/522 |
| 5,289,507 A | * | 2/1994 | Upp ............................. | 375/372 |
| 5,297,180 A | * | 3/1994 | Upp et al. .................... | 375/112 |
| 5,331,641 A | * | 7/1994 | Parruck et al. ............... | 370/506 |
| 5,390,180 A | * | 2/1995 | Reilly .......................... | 370/476 |
| 5,717,693 A | * | 2/1998 | Baydar et al. ................ | 370/514 |

\* cited by examiner

Primary Examiner—Hassan Kizou
Assistant Examiner—John Pezzlo
(74) Attorney, Agent, or Firm—Gordon & Jacobson, P.C.

(57) ABSTRACT

Methods for retiming and realigning SONET signals include demultiplexing STS-1 signals from an STS-3 signal, buffering each of the three signals in a FIFO, determining the FIFO depth over time, determining a pointer leak rate based in part on FIFO depth and also based on the rate of received pointer movements. For a 28-byte deep FIFO, if the depth of a FIFO is 12–16 bytes, no pointer leaking is performed. If the depth is 0–4 bytes, an immediate positive leak is performed. If the depth is 24–28, an immediate negative leak is performed. If the depth is 5–11 bytes a calculated positive leak is performed. If the depth is 17–23 bytes, a calculated negative leak is performed. The calculated leak rates are based on the net number of pointer movements (magnitude of positive and negative movements summed) received every 32 seconds (256,000 frames).

17 Claims, 3 Drawing Sheets

| FIG.2A |
|---|
| FIG.2B |

US 6,577,651 B2

1

METHODS AND APPARATUS FOR RETIMING AND REALIGNING SONET SIGNALS

This application is related to co-owned U.S. Pat. No. 5,331,641, the complete disclosure of which is hereby incorporated herein by reference.

BACKGROUND OF THE INVENTION

1. Field of the Invention

The invention relates to telecommunications. More particularly, the invention relates to methods and apparatus for calculating a pointer leak rate for retiming a SONET signal.

2. State of the Art

Since the early nineteen sixties, three different digital multiplexing and signalling hierarchies have evolved throughout the world. The hierarchies were developed in Europe, Japan, and North America. Fortunately, all are based on the same pulse code modulation (PCM) signalling rate of 8,000 samples per second, yielding 125 microsecond sampling slots (1 second/8,000 samples=0.000125). Japan and North America base their multiplexing hierarchies on the DS-1 rate of 1.544 Mbit/sec±20 ppm, although the higher data rates in Japan do not correspond to the higher rates used in North America. Europe bases multiplexing on a rate of 2.048 Mbits/sec called E1 which carries thirty voice circuits compared to the twenty-four carried in the DS-1 rate. The next most common higher rates in the U.S. and Europe are DS-3 and E3, respectively, which have rates of 44.736 Mbit/sec±20 ppm and 34.368 Mbit/sec±20 ppm, respectively.

The Synchronous Optical Network (SONET) or the Synchronous Digital Hierarchy (SDH), as it is known in Europe, is a common transport scheme which is designed to accommodate both DS-1 and E-1 traffic as well as multiples (DS-3 and E3) thereof. Developed in the early 1980s, SONET has a base (STS-1) rate of 51.84 Mbit/sec in North America. In Europe, the base (STM-1) rate is 155.520 Mbit/sec, equivalent to the North American STS-3 rate (3*51.84=155.520). The abbreviation STS stands for Synchronous Transport Signal and the abbreviation STM stands for Synchronous Transport Module. STS-n signals are also referred to as Optical Carrier (OC-n) signals when transported optically rather than electrically.

The basic STS-1 signal which has a frame length of 125 microseconds (8,000 frames per second) and is organized as a frame of 810 octets (9 rows by 90 byte-wide columns). The first three columns of each row consist of transport overhead (TOH). Of these twenty-seven octets, nine are allocated for section overhead and eighteen are allocated for line overhead. The remainder of the frame (9 rows of 87 columns= 783 octets) is referred to as the envelope or Synchronous Payload Envelope (SPE) or, in Europe, the Virtual Container. The first column of the envelope is reserved for STS path overhead (POH) and is referred to as the transport part of the envelope. The remaining 86 columns is referred to as the user part of the envelope. "Path" represents the complete transit through the SONET network. "Line" represents transit from one multiplexer to another. "Section" represents transit from one network element to another.

In order for data to be accommodated efficiently in the SPE, the 87 bytes of the SPE are divided into three blocks each including 29 columns. The POH occupies column 1 and "fixed stuff" (bytes which convey no information) is inserted into the 30th and 59th columns. Data is accommo-

2 dated in the remaining 3*28=84 columns=756 bytes. An STS-n signal is comprised of n STS-1 signals which are frame aligned and byte-interleaved. An STS-nC signal is comprised of n STS-1 signals which are frame aligned and concatenated. Currently, the highest level STS signal is STS-192 which has a line rate of 9,953.28 Mbit/sec.

These various synchronous optical network signals contain payload pointers which provide a method of allowing flexible and dynamic alignment of the SPE (Virtual Container) within the envelope or container capacity, independent of the actual contents of the envelope or container. Dynamic alignment means that the STS or STM respective SPE or Virtual Container is allowed to float within the STS/Virtual Container envelope capacity/container. For example, an STS-1 SPE may begin anywhere in the STS-1 envelope capacity. Typically, it will begin in one STS-1 frame and end in the next frame. The STS payload pointer is contained in the H1 and H2 bytes (the first two bytes) of the line overhead. These two bytes designate the location of the payload byte (the J1 byte) where the STS SPE begins.

When first generated, an SPE is aligned with the line overhead at the originating node (i.e., the pointer value is fixed to some value from 0 to 782). As the frame is carried through a network, however, it arrives at intermediate nodes (e.g., multiplexers or cross-connects) having an arbitrary phase with respect to the outgoing transport framing of the intermediate nodes. If the SPE had to be frame-aligned with the outgoing signal, the frame would need to be buffered and delayed. Thus, the avoidance of frame alignment allows SPEs on incoming links to be immediately relayed to outgoing links without artificial delay. The location of the SPE in the outgoing payload envelope is specified by setting the H1, H2 pointer to the proper value (0–782). The pointer values are regenerated at each intermediate node in the network.

In addition, if there is a frequency offset between the frame rate of the transport overhead and that of the STS SPE, then the pointer value will be incremented or decremented, as needed, accompanied by a corresponding positive or negative stuff byte. If the frame rate of the STS SPE is too slow with respect to the transport overhead, then the alignment of the envelope must periodically slip back in time, and the pointer must be incremented by one. This operation is indicated by inverting selected odd bits (I-bits) of the pointer word to allow five-bit majority voting (or 8 out of 10 as per Bellcore requirements) at the receiver. A positive stuff byte appears immediately after the H3 byte in the frame containing inverted I-bits. Subsequent pointers will contain the new offset value.

If the frame rate of the STS SPE is too fast with respect to that of the transport overhead, then the alignment of the envelope must be periodically advanced in time, and the pointer must be decremented by 1. This operation is indicated by inverting selected even bits (D-bits) of the pointer word to allow five-bit majority voting at the receiver. A negative stuff byte appears in the H3 byte in the frame containing the inverted D-bits. Subsequent pointers will contain the new offset value.

U.S. Pat. No. 5,331,641 (the complete disclosure of which is hereby incorporated by reference herein) discloses methods and apparatus for retiming and realignment of STS-1 signals into STS-3 type signal. The SPE of an incoming STS-3 type signal is demultiplexed into three STS-1 payloads and fed to three FIFOs, and a byte which is synchronous with the TOH is tracked through the three FIFOs to provide an indication of the FIFO depth. A frame count is also kept to track the number of frames since a last pointer movement. Stuffs or destuffs are generated based on the FIFO depth as well as based on the frame count, with a stuff or destuff generated as quickly as four frames from a previous pointer movement if the FIFO is close to full or close to empty, and less quickly (e.g., at thirty-two frames from a previous pointer movement) if the FIFO is only starting to empty or to fill. The '641 patent mentions a "pointer recalculation block" but does not disclose details about pointer recalculation.

Pointer recalculation is generally accomplished by summing the positive and negative pointer movements with the previous pointer. There are practical limits as to the frequency and magnitude of pointer movements and these are part of the SONET standards. In order to assure that pointer movements do not exceed the number permitted by the standards and also in order to avoid unnecessary pointer movements, it is known to "leak" pointer movements. Pointer leaking involves buffering several pointer movements, summing them, and leaking the net pointer movement after a period of accumulating pointer movements. The '641 patent does not teach how to leak pointers. Advantageously, the pointer leak rate is adjustable based on the amount of jitter in the STS signal. Known methods of calculating a pointer leak rate are often cumbersome in terms of the amount of code needed to calculate the leak rate.

SUMMARY OF THE INVENTION

It is therefore an object of the invention to provide methods and apparatus for retiming and realigning SONET signals.

It is also an object of the invention to provide methods and apparatus for retiming and realigning SONET signals which incorporate the calculation of a pointer leak rate.

It is another object of the invention to provide methods for calculating a pointer leak rate which is efficient and compact.

It is still another object of the invention to provide methods for calculating a pointer leak rate which is accurate.

In accord with these objects which will be discussed in detail below, the method for retiming and realigning SONET signals of the present invention includes demultiplexing STS-1 signals from an STS-3 signal, buffering each of the three signals in a FIFO, determining the FIFO depth over time, and determining a pointer leak rate based in part on FIFO depth and also based on the rate of received pointer movements. The apparatus of the invention includes a dual port RAM FIFO, a write address generator based on the incoming signal clock, a read address generator based on the outgoing signal clock, a FIFO depth counter synchronized to First_Byte of the SPE written to the FIFO, a FIFO depth latch synchronized to the First_Byte read from the FIFO, and circuitry for calculating leak rate based on FIFO depth and number of pointer movements received over a period of time.

According to the presently preferred embodiment, each FIFO is 28 bytes deep. If the depth of a FIFO is 12–16 bytes, no pointer leaking is performed. If the depth is 0–4 bytes, an immediate positive leak is performed. If the depth is 24–28, an immediate negative leak is performed. If the depth is 5–11 bytes a calculated positive leak is performed. If the depth is 17–23 bytes, a calculated negative leak is performed. The calculated leak rates are based on the net number of pointer movements (magnitude of positive and negative movements summed) received every 32 seconds (256,000 frames). A look up table is provided with nine leak rates, expressed as a number of milliseconds between leaks. If the number of pointer movements received in the last 32 seconds is less than 32, the leak spacing is 960 ms. The relationship between leak spacing values and the number of pointer movements received in the last 32 seconds is linear. I.e., if the pointer movement rate is doubled, the leak spacing time is halved. The calculated leak rate is preferably reset to minimum spacing every time a new pointer occurs and every time a loss of frame occurs. The pointer leak rate calculation according to the invention is efficient and accurate. A sliding window is not needed. Summing is repeated every 32 seconds.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
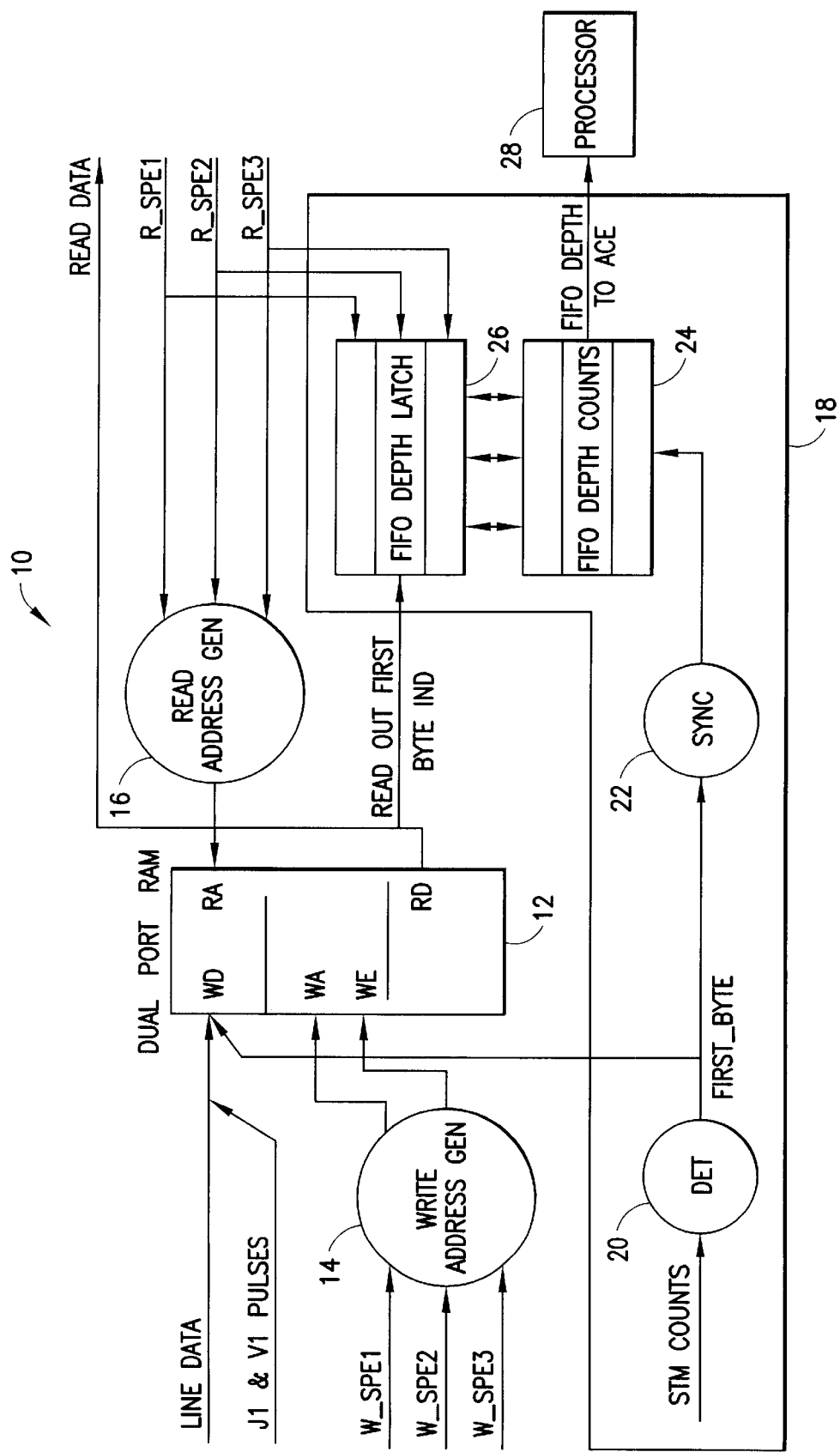
FIG. 1 is a high level block diagram of an apparatus of the invention for performing one of the methods of the invention.

Turning now to FIG. 1, an apparatus 10 according to the invention includes three FIFOs preferably implemented in a dual port RAM 12, a write address generator 14, a read address generator 16, and a FIFO depth measurement circuit 18. The RAM 12 has a data input WD (write data), a data output RD (read data), an address input WA (write address), an address output RA (read address), and a write enable input WE. The write address generator 14 receives input from a demultiplexer (not shown) regarding the writing of data of three SPEs, SPE1, SPE2, and SPE3, provides output to the WA and WE inputs of the RAM 12. The read address generator receives input from a multiplexer (not shown) regarding the reading of SPE1, SPE2, and SPE3 data and provides output to the RA input of the RAM 12.

The FIFO depth measurement circuit 18 includes a First_Byte detector 20, a synchronizer 22, three FIFO depth counters 24, and three FIFO depth latches 26. The First_Byte detector 20 receives STM counts from the aforementioned demultiplexer (not shown) and provides an indication of the First_Byte (first byte after the nine TOH bytes in the first row of a frame) to the synchronizer 22 which provides output to the FIFO depth counters 24. The FIFO depth latches 26 receive input from the FIFO depth counters 24, the RD output of the RAM 12 and the SPE1, SPE2, and SPE3 indications of the aforementioned multiplexer. The FIFO depth counters 24 and the FIFO depth latches 26 cooperate to provide three FIFO depth counts which are used by a processor 28 to determine a pointer leak rate as described in more detail below with reference to FIG. 2.

The data input WD of the FIFO 12 receives line data, J1 and V1 pulses, and the First_Byte indication. The writing to the FIFO 12, is performed by the write address generator 14 when a valid data byte is available on the Line-Data input. This valid data byte is indicated by the W_SPE1–W_SPE3 lines. The J1 & V1 pulses are also written into the FIFO and read from the FIFO for generation of the output pointer. The read address generator 16 increments every time one of the R_SPE1–R_SPE3 lines is active. The output of the FIFO includes the data, control information, and the First_Byte indication.

The depth of the FIFO is measured from a fixed location (First_Byte) in the SONET frame. The First_Byte is the byte immediately following the nine TOH bytes of the first row of the frame. Although the actual depth of the FIFO is determined by the write address and the read address, it can not be measured directly by subtraction because the read and write address generators are running on two different clocks. In order to overcome this problem, the invention uses the "First_Byte" marker pulse generated on the write side of the FIFO. This marker is written into the FIFO along with the other bytes and controls. This "First_Byte" marker is passed on directly to the read side, is synchronized with the read clock domain and is used to initialize the depth counters. These depth counters then increment every time the read address generator increments. When the First_Byte marker is read out from the FIFO, the FIFO depth value is passed on to a processor for use in leak rate calculation as described in more detail below. According to the presently preferred embodiment, the processor used to calculate the leak rate is an ACE RISC processor from TranSwitch Corporation, Shelton, Conn.

As mentioned above the pointer leak rate is based on the FIFO depth as well as on the net number of pointer movements over time. Table 1 illustrates the first step in determining the pointer leak rate using a 28-byte FIFO.

TABLE 1

| FIFO Depth | Leak Rate | "Zone" |
|---|---|---|
| 0–4 | Immediate Positive Leak | 2 |
| 5–11 | Calculated Positive Leak | 1 |
| 12–16 | No Leaking | 0 |
| 17–23 | Calculated Negative Leak | 1 |
| 24–28 | Immediate Negative Leak | 2 |

As mentioned above, according to the presently preferred embodiment, each FIFO is 28 bytes deep. When data rates are ideal and synchronized, the FIFO depth will stabilize at about fourteen bytes. Thus, according to a preferred embodiment of the invention, if the depth of a FIFO is 12–16 bytes, no pointer leaking is performed. This depth range is referred to as "Zone 0" in Table 1 and in FIG. 2, described below. If the depth is 5–11 bytes a calculated positive leak is performed and if the depth is 17–23 bytes, a calculated negative leak is performed. These depth ranges are referred to as "Zone 1" in Table 1 and in FIG. 2 described below. If the depth is 0–4 bytes, an immediate positive leak is performed and if the depth is 24–28, an immediate negative leak is performed. These depth ranges are referred to as "Zone 2" in Table 1 and in FIG. 2 described below.

The calculated leak rates are based on the net number of pointer movements "N" (magnitude of positive and negative movements summed) received every 32 seconds (256,000 frames). A look up table is provided with nine leak rates, expressed as number of ms between leaks. The presently preferred rates are illustrated in Table 2, the last entry of which assumes that the leak rate calculation processor supports a resolution of 0.25 ms. If the processor only supports a resolution of 0.5 seconds, the last entry in Table 2 should be 3.5 ms.

TABLE 2

| Value of N | Spacing between Pointer Leaks |
|---|---|
| N < 32 | 960 ms |
| 32 ≤ N < 64 | 480 ms |
| 64 ≤ N < 128 | 240 ms |
| 128 ≤ N < 256 | 120 ms |
| 256 ≤ N < 512 | 60 ms |
| 512 ≤ N < 1024 | 30 ms |
| 1024 ≤ N < 2048 | 15 ms |
| 2048 ≤ N < 4096 | 7.5 ms |
| N > 4096 | 3.75 ms |

The maximum theoretical rate of pointer leaks is an approximately 6.48 ms spacing between pointer leaks. Therefore, the initial calculated leak rate should be set lower than 6.48 ms between pointer leaks. According to the presently preferred embodiment, the calculated leak rate is initially set to 4 ms spacing. The calculated leak rate is reset to 4 ms following any system reset, loss of pointer (LOP), or loss of frame (LOF event) and is reset every 32 seconds according to the methods described below with reference to FIG. 2.

Figures 2, 2A:
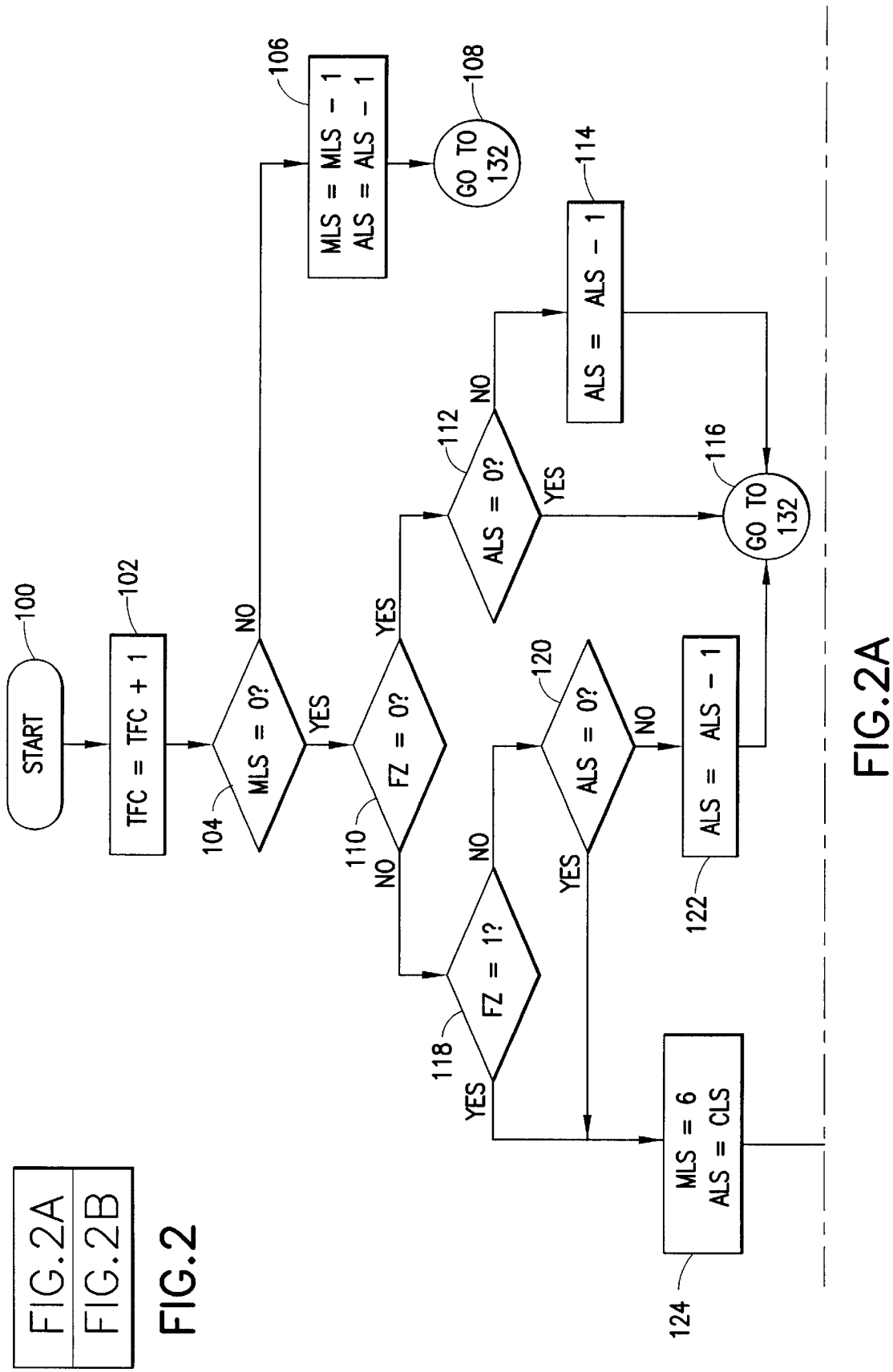
FIG. 2 is a simplified flow chart illustrating some of the other methods of the invention.
Figure 2B:
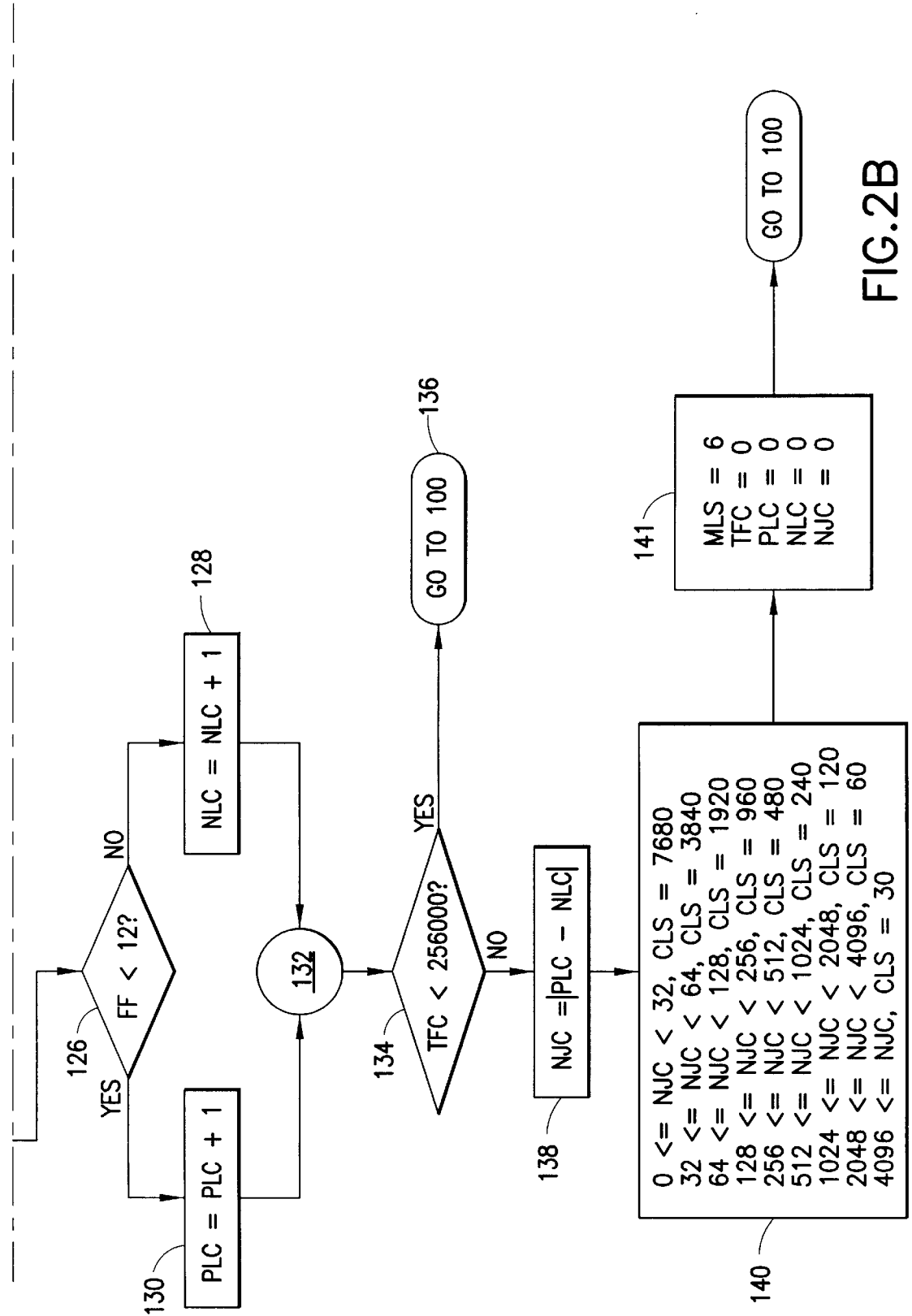

The abbreviations used in FIG. 2 are defined below in Table 3.

TABLE 3

| Variable | Name | Description | Initial Value |
|---|---|---|---|
| FF | FIFO Fill | The depth of the FIFO, 0–28. | |
| FZ | FIFO Zone | The three Zones described in Table 1. | |
| MLS | Minimum Leak Space | The minimum number of frames that have elapsed after first justification took place before next justification is allowed. This value is configurable by defaults to 6. | 6 |
| ALS | Average Leak Space | The average number of frames between two justifications when the second justification takes place with the FIFO in Zone 1. | CLS |
| CLS | Calculated Leak Space | This is the calculated leak spacing of Table 2 expressed as a number of frames. On start, CLS has the same value as MLS. | 6 |
| TFC | Total Frame Count | This counter is used to indicate the 32 seconds between recalculations of CLS. (256,000 frames = 32 seconds) | 0 |
| PLC | Positive Leak Counter | The total number of positive justifications in a given 32 second window, reset to 0 every 32 seconds. | 0 |
| NLC | Negative Leak Counter | The total number of negative justifications in a given 32 second window, reset to 0 every 32 seconds. | 0 |
| NJC | Net Justification Count | The difference between PLC and NLC at the end of each 32 second window | 0 |

FIG. 2 illustrates one manner in which the leak rate calculation methods of the invention may be implemented. According to the embodiment shown in FIG. 2, the algorithm starts at 100 with the variables of Table 3 set to their initial value. For each frame, the total frame count (TFC) is incremented by one at 102. The minimum leak space (MLS)

is checked at 104. If it is not equal to zero, the MLS is decremented by one at 106 where the average leak space (ALS) is also decremented by one and the program jumps to 132. From 132, the total frame count is checked at 134 to determine whether 256,000 frames (32 seconds) have elapsed. If fewer than 256,000 frames have elapsed, the net justification count (NJC) is not set and the program returns to 100 for the next frame. It will be appreciated that since the initial value of MLS is six, the algorithm will cycle through the above described steps six times before proceeding to 110. When the program first reaches 110, both MLS and ALS will be zero and TFC will be six. At 110, the FIFO zone (FZ) is checked. If FZ is zero, as illustrated in Table 1, no leaking will be performed. The ALS will be checked at 112. If it is not zero, it will be decremented by one at 114. In either case, the program will then jump to 132, check the TFC at 134 and return to 100 without setting the NJC if the total frame count indicates that fewer than 256,000 frames have elapsed. Thus, following the first six frames, the program will continue through the above described steps until it is determined at 110 that the FIFO depth is outside zone zero.

If it is determined at 110 that the FIFO depth is outside zone zero, it is further determined at 118 whether the FIFO depth is in zone one or zone two. If it is in zone two, the ALS is checked at 120. If ALS is not zero, it is decremented by one at 122 and the program jumps to 132. If the FIFO depth is in zone two or if it is in zone one and the ALS is zero, MLS is set to six and the ALS is set to the CLS at 124. It will be appreciated that the first time the program reaches step 124, the CLS will still be at its initial value of six. Thus, following from step 124, both MLS and ALS will be set to six as they were when the program started with the first frame. Following step 124, the FIFO length FF is examined and it is determined at 126 whether it is in a positive leak zone or a negative leak zone. (See Table 1.) If the FIFO length is not in zone zero and is less that 12, it is in a positive leak zone. Otherwise it is negative.) If the FIFO length is in a positive zone (FF<12), the positive leak counter (PLC) is incremented by one at 130. If it is in a negative zone, the negative leak counter (NLC) is incremented by one at 128. In either case, the program continues to 132 and 134 where the TFC is checked. If the TFC=256,000 (32 seconds expire), the net justification count (NJC) is calculated at 138 by taking the absolute value of the difference between PLC and NLC. Using the recalculated NJC, a new CLS is set from the lookup table at 140. The CLS found at 140 is then used as the calculated leak rate when leaking in zone one of Table 1 until a new CLS is determined. Following the determination of CLS at 140, the MLS is reset to six, the TFC, PLC, NLC, and NJC are reset to zero at 141 and the process shown in FIG. 2 is repeated for another 32 seconds.

There have been described and illustrated herein methods for retiming and realigning SONET signals. While particular embodiments of the invention have been described, it is not intended that the invention be limited thereto, as it is intended that the invention be as broad in scope as the art will allow and that the specification be read likewise. For example, while a preferred embodiment of the FIFOs each have a capacity of 28-bytes, it will be appreciated that FIFOs of other lengths could be used while dividing the FIFO into five zones. It will therefore be appreciated by those skilled in the art that yet other modifications could be made to the provided invention without deviating from its spirit and scope as so claimed.

What is claimed is:

1. A method for retiming and realigning SONET signals, comprising:

a) demultiplexing STS-1 signals from an STS-3 signal;

b) buffering each of the STS-1 signals in a FIFO;

c) determining FIFO depth over time;

d) indicating a calculated positive leak rate according to net pointer justification count over a set time period when the FIFO length is greater than a first threshold and less than a second threshold; and e) indicating a calculated negative leak rate according to net pointer justification count over a set time period when the FIFO length is greater than a third threshold and less than a fourth threshold.

2. The method according to claim 1, wherein:

said set time period is thirty-two seconds.

3. The method according to claim 1, further comprising:

f) repeatedly determining net pointer justification count over said set time period.

4. The method according to claim 3, wherein:

said set time period is thirty-two seconds.

5. The method according to claim 1, further comprising:

f) indicating an immediate positive pointer leak if the FIFO length is less than a fifth threshold and indicating an immediate negative pointer leak if the FIFO length is greater than a sixth threshold.

6. The method according to claim 1, wherein:

said step of buffering includes buffering each STS-1 signal in a FIFO having a capacity of n bytes, said first threshold is approximately 0.2n, said second threshold is approximately 0.4n, said third threshold is approximately 0.6n, and said fourth threshold is approximately 0.8n.

7. The method according to claim 5, wherein:

said step of buffering includes buffering each STS-1 signal in a FIFO having a capacity of n bytes, said fifth threshold is approximately 0.2n, and said sixth threshold is approximately 0.8n.

8. The method according to claim 7, wherein:

said first threshold is approximately 0.2n, said second threshold is approximately 0.4n, said third threshold is approximately 0.6n, and said fourth threshold is approximately 0.8n.

9. The method according to claim 8, wherein:

n=28, said first threshold is 4, said second threshold is 12, said third threshold is 16, said fourth threshold is 24, said fifth threshold is 5, and said sixth threshold is 23.

10. The method according to claim 9, wherein:

said set time period is thirty-two seconds.

11. An apparatus for retiming and realigning SONET signals, comprising:

a) a dual port RAM FIFO;

b) a write address generator based on an incoming signal clock;

c) a read address generator based on an outgoing signal clock;

d) a FIFO depth counter synchronized by a synchronizer to First_Byte of an SPE written to the FIFO;

e) a FIFO depth latch synchronized by the FIFO depth counter to First_Byte read from the FIFO;

f) means for indicating a calculated positive leak rate according to net pointer justification over a set time period when the FIFO length is greater than a first threshold and less than a second threshold, and g) means for indicating a calculated negative leak rate according to net pointer justification over a set time period when the FIFO length is greater than a third threshold and less than a fourth threshold.

12. The apparatus according to claim 11, wherein:

said set time period is thirty-two seconds.

13. The apparatus according to claim 11, further comprising:

h) means for indicating an immediate positive pointer leak if the FIFO length is less than a fifth threshold and indicating an immediate negative pointer leak if the FIFO length is greater than a sixth threshold.

14. The apparatus according to claim 11, wherein:

said FIFO is an n-byte FIFO, said first threshold is approximately 0.2n, said second threshold is approximately 0.4n, said third threshold is approximately 0.6n, and said fourth threshold is approximately 0.8n.

15. The apparatus according to claim 13, wherein:

said FIFO is an n-byte FIFO, said first threshold is approximately 0.2n, said second threshold is approximately 0.4n, said third threshold is approximately 0.6n, said fourth threshold is approximately 0.8n, said fifth threshold is approximately 0.2n, and said sixth threshold is approximately 0.8n.

16. The apparatus according to claim 13, wherein:

n=28, said first threshold is 4, said second threshold is 12, said third threshold is 16, said fourth threshold is 24, said fifth threshold is 5, and said sixth threshold is 23.

17. The apparatus according to claim 16, wherein:

said set time period is thirty-two seconds.

* * * * *